United States Patent
Matsuno (10) Patent No.: US 6,553,303 B2
(45) Date of Patent: Apr. 22, 2003

(54) DRIVING FORCE DISTRIBUTION CONTROL SYSTEM AND VEHICLE HAVING THE DRIVING FORCE DISTRIBUTION CONTROL SYSTEM

(75) Inventor: Koji Matsuno, Tokyo (JP)

(73) Assignee: Fuji Jukogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 09/883,782

(22) Filed: Jun. 18, 2001

(65) Prior Publication Data
US 2002/0002433 A1 Jan. 3, 2002

(30) Foreign Application Priority Data
Jun. 29, 2000 (JP) ........................................ 2000/197204

(51) Int. Cl.$^7$ .............................................. B60K 17/35
(52) U.S. Cl. ............................. 701/67; 701/51; 701/54; 701/69; 180/244; 477/166; 477/174; 477/175; 477/181
(58) Field of Search ............................... 701/67, 69, 51, 701/54; 180/244; 477/166, 174, 175, 181

(56) References Cited

U.S. PATENT DOCUMENTS

| | | | | |
|---|---|---|---|---|
| 4,890,685 A | * | 1/1990 | Naito | 180/233 |
| 5,132,908 A | * | 7/1992 | Eto et al. | 180/197 |
| 5,631,829 A | * | 5/1997 | Takasaki et al. | 180/248 |
| 5,701,247 A | * | 12/1997 | Sasaki | 180/197 |
| 5,839,084 A | * | 11/1998 | Takasaki et al. | 180/197 |
| 6,059,065 A | * | 5/2000 | Takeda et al. | 180/244 |

FOREIGN PATENT DOCUMENTS

JP     8-002278     1/1996

* cited by examiner

Primary Examiner—Michael J. Zanelli
Assistant Examiner—Eric M Gibson
(74) Attorney, Agent, or Firm—Frishauf, Holtz, Goodman & Chick, P.C.

(57) ABSTRACT

A correction coefficient setting unit calculates as a difference in an actual revolution speed the difference between the actual revolution speed of a front driving axle and the actual revolution speed of a rear driving axle. Moreover, the correction coefficient setting unit calculates the ideal reference revolution speed of the front driving axle and the ideal reference revolution speed of the rear driving axle in consideration of a difference in a radius of gyration between the driving axles. The correction coefficient setting unit also calculates as a difference in a reference revolution speed the difference between the ideal reference revolution speed of the front driving axle and the ideal reference revolution speed of the rear driving axle. The correction coefficient setting unit then corrects a previous correction coefficient relevant to a transfer clutch set in the basic clutch tightening force correction unit according to the difference in an actual revolution speed and the difference in a reference revolution speed.

9 Claims, 7 Drawing Sheets

DRIVING FORCE DISTRIBUTION CONTROL SYSTEM AND VEHICLE HAVING THE DRIVING FORCE DISTRIBUTION CONTROL SYSTEM

BACKGROUND OF THE INVENTION

1. Field of the Invention

The present invention relates to a driving force distribution control system for controlling a distribution of a driving force from an engine between two drive members via a clutch that can be tightened or released, such as, a transfer clutch or a limited slip differential clutch, and to a vehicle having such driving force distribution control system.

2. Description of the Related Art

In general, many vehicles adopt a hydraulic multi-disc clutch or other clutches to control a distribution of a driving force to wheels. Specifically, the distribution of the driving force for a vehicle is controlled by controlling the distribution of the driving force to a front axle and/or a rear axle in a four-wheel drive vehicle, or by controlling a limited slip differential that connects or disconnects the front axle to or from the rear axle, or a left wheel to or from a right wheel.

When the distribution of the driving force is thus controlled, a clutch tightening force is determined accurately based on driving conditions of the vehicle. Thus, the distribution of the driving force is achieved properly without occurrence of tight corner braking phenomena due to a difference of a turning radius of wheels.

For example, Japanese Unexamined Patent Publication No. 8-2278 has disclosed a driving force control method for preventing an occurrence of the phenomena of the tight corner braking. According to this driving force control method, it is judged whether a four-wheel drive vehicle has made a turn at a large steering angle. If it is judged that the vehicle has made the turn at the large steering angle, a limited slip differential clutch is controlled in order to reduce a transmission torque.

However, there are many drawbacks described below in the foregoing method of controlling the driving force using a hydraulic multi-disc clutch. Namely, even when a transmission of the driving force is controlled as properly as usual, the phenomena of the tight corner braking may occur because of a difference in the properties of the clutch, a slight allowance difference of the product, and/or due to long use. Otherwise, main driving wheels may slip, or inner wheels alone may slip during turning of a vehicle.

Actually a transmitted torque may be detected and fed back in order to optimize a set value of clutch tightening force. In this case, however, a torque sensor must be installed on the driving axles. This method is therefore unfeasible (not practical).

SUMMARY OF THE INVENTION

Accordingly, an object of the present invention is to provide a driving force distribution control system for a vehicle. The driving force distribution control system can determine an appropriate clutch tightening force highly and precisely in consideration of a difference in the properties of the clutch, a slight allowance difference of the product, and/or due to long use without the necessity of mounting a torque sensor or the like on driving axles.

In efforts to accomplish the above object, according to the present invention, there is provided a driving force distribution control system for controlling a transmission of a driving force from a first driving axle to a second driving axle via a clutch, which comprises: basic clutch tightening force calculating means for calculating a basic clutch tightening force to be exerted in tightening the clutch; basic clutch tightening force correcting means for correcting the basic clutch tightening force by using a correction value; actual speed difference calculating means for calculating an actual speed difference between an actual revolution speed of the first driving axle and an actual revolution speed of the second driving axle; reference speed difference calculating means for calculating a reference speed difference in dependency on a kinetic state of a vehicle; and correction value setting means for correcting the correction value to be used by the basic clutch tightening force correcting means according to the actual speed difference and the reference speed difference.

The above and other objects, features and advantages of the invention will become more clearly understood from the following description when referring to the accompanying drawings.

DESCRIPTION OF THE PREFERRED EMBODIMENTS

An embodiment of the present invention will be described in conjunction with the drawings below.

Figure 1:
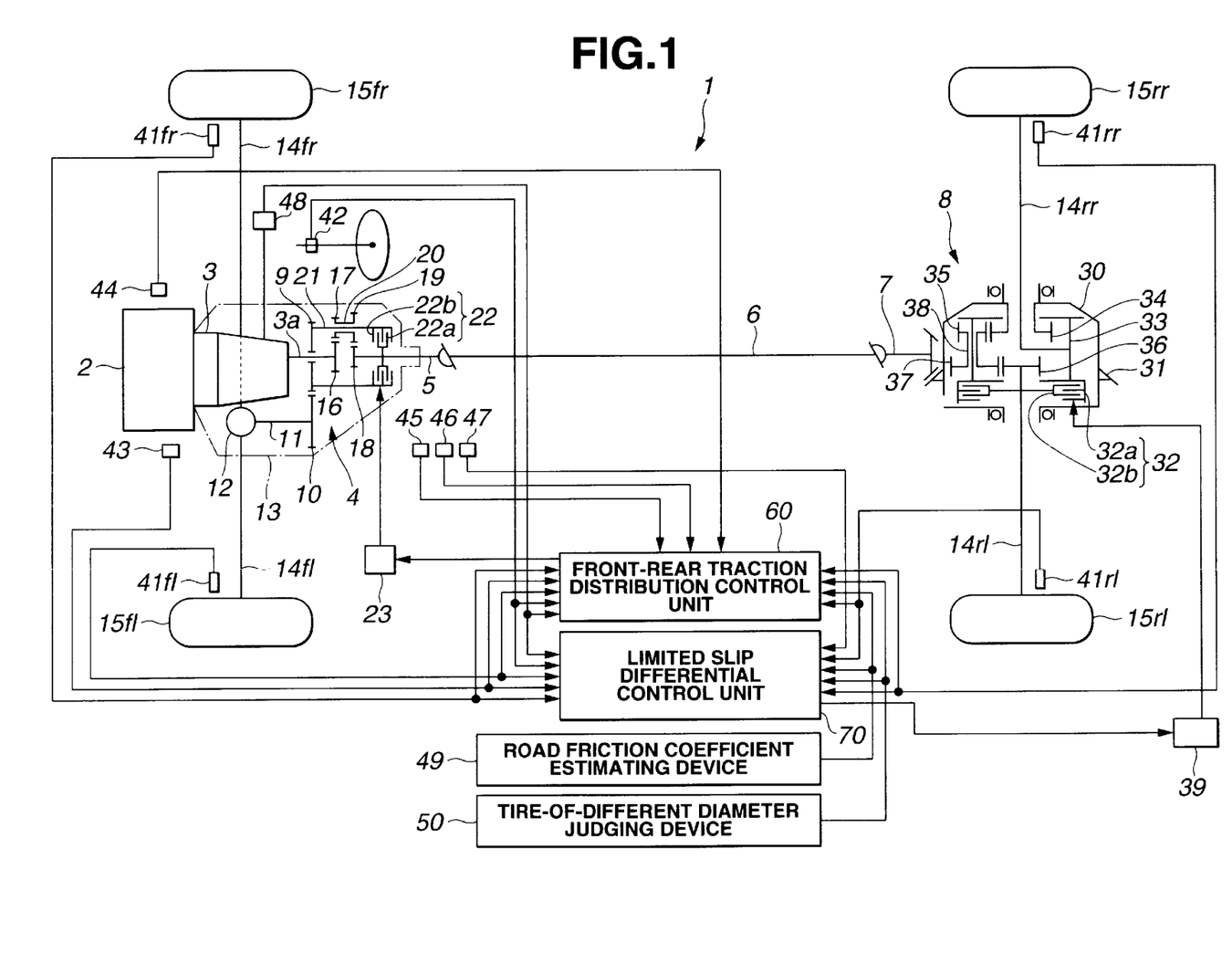
FIG. 1 is an explanatory diagram schematically showing a driving system in a vehicle and a traction distribution control system therein.

Referring to FIG. 1, a vehicle 1 is, for example, a four-wheel drive vehicle having a complex planetary gear train type center differential and an automatic transmission.

A driving force from an engine 2 located in the front part of the vehicle 1 is transmitted to a center differential 4 through a transmission output shaft 3a through an automatic transmission (shown to include a torque converter and others) 3 located behind the engine 2.

The driving force from the engine 2 is further transmitted from the center differential 4 to a final reduction gear device 8 by a rear driving axle 5, a propeller shaft 6, and a driving pinion 7.

The driving force from the engine 2 is also transmitted to a front-wheels final reduction gear device 12 through a front driving axle 11, which is the shaft of a driving pinion, via a transfer driving gear 9 and a transfer driven gear 10.

The automatic transmission 3, center differential 4, and front-wheels final reduction device 12 are integrated into a case 13.

Moreover, the driving force fed to the rear-wheels final reduction device 8 is transmitted to a left rear wheel 15*rl* through a left rear-wheel driving axle 14*rl* and to a right rear wheel 15*rr* through a right rear-wheel driving axle 14*rr*.

Moreover, the driving force fed to the front-wheels final reduction device 12 is transmitted to a left front wheel 15*fl* through a front wheel left driving axle 14*rl* and to a right front wheel 15*fr* through a front wheel right driving axle 14*fr*.

The center differential 4 includes a first sun gear 16 of a large diameter mounted on the transmission output shaft 3*a* located near an input member of the center differential 4. The first sun gear 16 meshes with a first pinion 17 of a small diameter, thus forming a first gear train.

A second sun gear 18 of a small diameter is mounted on the rear driving axle 5 that transmits power to the rear wheels. The second sun gear 18 meshes with a second pinion 19 of a large diameter, thus forming a second gear train.

The first pinion 17 and second pinion 19 are formed as integral parts of a pinion member 20. A plurality of (for example, three) pinion members 20 is borne by a stationary shaft fixed to a carrier 21.

Moreover, a transfer driving gear 9 is coupled to the front end of the carrier 21, whereby power is transmitted to the front wheels.

The transmission output shaft 3*a* is inserted into the front side of the carrier 21 so that it can revolve freely, while the rear driving axle 5 is inserted into the rear side thereof so that it can revolve freely. The carrier 21 has the first sun gear 16 and second sun gear 18 stored (arranged) in the center space thereof.

The first pinions 17 of the plurality of pinion members 20 are meshed with the first sun gear 16. Moreover, the second pinions 19 thereof are meshed with the second sun gear 18.

The first sun gear 16 that is the input member of the center differential 4 is meshed with one output member thereof via the first and second pinions 17 and 19 and the second sun gear 18. The first sun gear 16 is meshed with the other output member thereof via the carrier 21 accommodating the first and second pinions 17 and 19. These gears therefore form a complex planetary gear train devoid of a ring gear.

In the complex planetary gear train type center differential 4, once the number of teeth of the first sun gear 16 and second sun gear 18 and the number of teeth of the first pinions 17 and second pinions 19, which are arranged around the sun gears 16 and 18, are set to appropriate values, the gears serve as differential gears.

Moreover, in the center differential 4, once the radius of the pitch circle of the first and second pinions 17 and 19 and the radius of the pitch circle of the first and second sun gears 16 and 18 are set to appropriate values, reference torque can be distributed at a desired ratio. For example, the torque is unequally distributed while having a major portion thereof fed to the rear wheels.

A hydraulic multi-disc clutch (transfer clutch) 22 is interposed as a clutch means between two output members of the center differential 4, that is, the carrier 21 and second sun gear 18.

The transfer clutch 22 consists of a plurality of driven plates 22*a*, which are mounted on the rear driving axle 5 integrated with the second sun gear 18, and a plurality of driving plates 22*b* that are placed on the carrier 21. The driven plates 22*a* and driving plates 22*b* are lined alternately.

The transfer clutch 22 is pressured with oil contained in a hydraulic chamber due to a piston and a pressure plate stored in the case 13 (pressure-related parts of the transfer clutch 2 are not shown), and thus put in motion. The hydraulic chamber is connected to a transfer clutch hydraulic control unit 23 controlled by a front-rear traction distribution control unit 60.

With the transfer clutch 22 released, torque is transmitted while distributed by the center differential 4. When the transfer clutch 22 is fully tightened, the differential motion of the center differential 4 is restricted, and a torque distribution is stopped. Consequently, the front and rear axles are connected to each other.

Tightening force to be exerted in tightening the transfer clutch 22 is determined or controlled by the front-rear traction distribution control unit 60 that will be described later. For example, a reference torque distribution ratio is 35 (front axle) to 65 (rear axle) so that a majority of torque will be fed to the rear wheels. When the front and rear axles are connected to each other, the torque distribution ratio becomes, for example, 50 (front axle) to 50 (rear axle). Torque distribution (power distribution) is controlled between the ratio of 35 to 65 to the ratio of 50 to 50.

Moreover, the rear-wheels final reduction device 8 employed in the present embodiment is, similarly to the center differential 4, of a complex planetary gear train type.

Specifically, a crown gear 31 is formed on the periphery of a differential case 30. The differential case 30 is held so that it can rotate freely. A driving force fed from the driving pinion 7 is transmitted to the differential case 30 via the crown gear 31.

A carrier 33 whose left part has a cylindrical shape to serve as a clutch drum 32*a* is stored in the differential case 30 so that the carrier 33 can rotate freely. The right rear-wheel driving axle 14*rr* is inserted in the carrier 33 and coupled to the carrier 33.

Moreover, a first sun gear 34 of a large diameter is placed in the differential case 30 while being coupled thereto. The first sun gear 34 meshes with a first pinion 35 of a small diameter, thus forming a first gear train.

Furthermore, the left rear-wheel driving axle 14*rl* is inserted in the differential case 30. A second sun gear 36 of a small diameter is attached to the tip of the left rear-wheel driving axle 14*rl*. The second sun gear 36 meshes with a second pinion 37 of a large diameter, thus forming a second gear train.

The first pinion 35 and second pinion 37 are formed as integral parts of a pinion member 38. A plurality (for example, three) of pinion members 38 is borne by a stationary shaft fixed to the carrier 33 so that the pinion members 38 can rotate freely.

Moreover, a clutch hub 32*b* is located to be opposed to the clutch drum 32*a* in the carrier 33 while being coupled to the left rear-wheel driving axle 14*rl*. Pluralities of driving plates and driven plates are alternately projected from the clutch drum 32*a* and clutch hub 32*b* respectively. Thus, a hydraulic multi-disc clutch 32 (limited slip differential (LSD) clutch) is constructed as clutch means.

The LSD clutch 32 is pressured with oil contained in a hydraulic chamber due to a piston and a pressure plate that are not shown, and thus put in motion. The hydraulic chamber is connected to a LSD clutch hydraulic control unit 39 controlled by a limited slip differential-for-right and left rear wheels control unit 70.

Specifically, the rear-wheels final reduction device 8 transmits a driving force received from the driving pinion 7 to the first sun gear 34 via the crown gear 31 and differential case 30. The driving force is then transmitted to the left rear-wheel driving axle 14*rl* via the second sun gear 36, and also transmitted to the right rear-wheel driving axle 14rr via the carrier 33. Thus, these gears of the rear-wheels final reduction device 8 constitute a complex planetary gear train type limited slip differential control device.

Furthermore, the rear-wheels final reduction device 8 has the LSD clutch 32 interposed between the left rear-wheel driving axle 14rl that is one output member thereof and the carrier 33 that is the other output member thereof. Friction occurring in the LSD clutch 32 can be varied.

In the rear-wheels final reduction device 8, the complex planetary gear train type limited slip differential control device generates limited slip differential torque that is proportional to an input torque. A limited slip differential torque of the LSD clutch also generates if necessary is added to the limited slip differential torque, whereby an optimal limited slip differential torque is generated.

Once the number of teeth of the first and second sun gears 34 and 36 and the number of teeth of the first and second pinions 35 and 37 are set to appropriate values, the gears of the rear-wheels final reduction device 8 constituting the complex planetary gear train type limited slip differential control device act as differential gears. The pluralities of first pinions 35 and second pinions 37 are arranged around the sun gears 34 and 36.

Moreover, once the radius of the pitch circle of the first and second sun gears 34 and 36 and the radius of the pitch circle of the first and second pinions 35 and 37 are set to appropriate values, the torque is distributed at a reference torque distribution ratio of 50 (left driving axle) to 50 (right driving axle).

Therefore, when the LSD clutch 32 is released by the limited slip differential-for-right and left rear wheels control unit 70, the right and left driving axles are revolved smoothly with the torque distributed at the reference ratio of 50 to 50. Once the LSD clutch 32 is tightened, the differential motion signifying that the right and left driving axles fixed to the left and right wheels are revolved with distributed torque is restricted. The vehicle is driven on a stable basis without slipping of the wheels.

Moreover, the wheels 15fl, 15fr, 15rl, and 15rr have their wheel speeds ωfl, ωfr, ωrl, and ωrr detected by wheel speed sensors (left front wheel speed sensor 41fl, right front wheel speed sensor 41fr, left rear wheel speed sensor 41rl, and right rear wheel speed sensor 41rr). These wheel speeds are transmitted to the front-rear traction control unit 60 and the limited slip differential-for-right and left rear wheels control unit 70.

Furthermore, the vehicle 1 includes a steering wheel angle sensor 42, a throttle angle sensor 43, an engine speed sensor 44, a yaw rate sensor 45, a lateral acceleration sensor 46, and a longitudinal acceleration sensor 47.

A steering wheel angle θH and a throttle angle θth detected by the steering wheel angle sensor 42 and throttle angle sensor 43 respectively are transmitted to the front-rear traction control unit 60 and limited slip differential-for-right and left rear wheels control unit 70.

Moreover, the number of engine revolutions Ne, a yaw rate γ, and a lateral acceleration Gy detected by the engine speed sensor 44, yaw rate sensor 45, and lateral acceleration sensor 46 respectively are transmitted to the front-rear traction control unit 60.

Furthermore, a longitudinal acceleration Gx detected by the longitudinal acceleration sensor 47 is transmitted to the limited slip differential-for-right and left rear wheels control unit 70.

Moreover, a gear ratio i is transmitted from a transmission control unit 48, which controls the automatic transmission 3, to the front-rear traction control unit 60 and the limited slip differential-for-right and left rear wheels control unit 70.

Moreover, a road friction coefficient estimating device 49 and a tire-of-different diameter judging device 50 are incorporated in the vehicle 1. The road friction coefficient estimating device 49 estimates a road friction coefficient $\mu$. The tire with different diameter judging device 50 judges whether a tire of a different diameter is attached to the vehicle 1 or not.

A road friction coefficient $\mu$ estimated by the road friction coefficient estimating device 49, and the result of judgment made by the tire with different diameter judging device 50 are transmitted to the front-rear traction control unit 60 and limited slip differential-for-right and left rear wheels control unit 70.

The road friction coefficient estimating device 49 estimates the road friction coefficient $\mu$ according to a method which the present inventor has proposed in Japanese Unexamined Patent Publication No. 8-2274. According to the method of estimating the road friction coefficient $\mu$, the cornering power of the front and rear wheels is estimated from a steering angle, a vehicle speed, or an actual yaw rate according to the equations of motion that express skidding of the vehicle. At this time, even the cornering power that has nonlinear relation to the steering angle, vehicle speed, or actual yaw rate is estimated therefrom. The road friction coefficient $\mu$ estimated from the ratios of the equal cornering power of the front and rear wheels occurring on a road, on which a high road friction coefficient $\mu$ (where $\mu$ equals 1) is observed, to an estimated value of cornering power. The road friction coefficient $\mu$ may be estimated according to any other method, for example, a method disclosed in Japanese Unexamined Patent Publication No. 2000-71968 filed by the present applicant.

Moreover, the tire with different diameter judging device 50 judges whether the vehicle 1 is driven rectilinearly (straightly). Whether tires with different diameters such as temporary tires are attached is judged from a value calculated by integrating a steering angle or differences among the wheel speeds observed during rectilinear driving. The steering angle is calculated based on an output of the steering wheel angle sensor provided during rectilinear (straight) driving.

Figure 2:
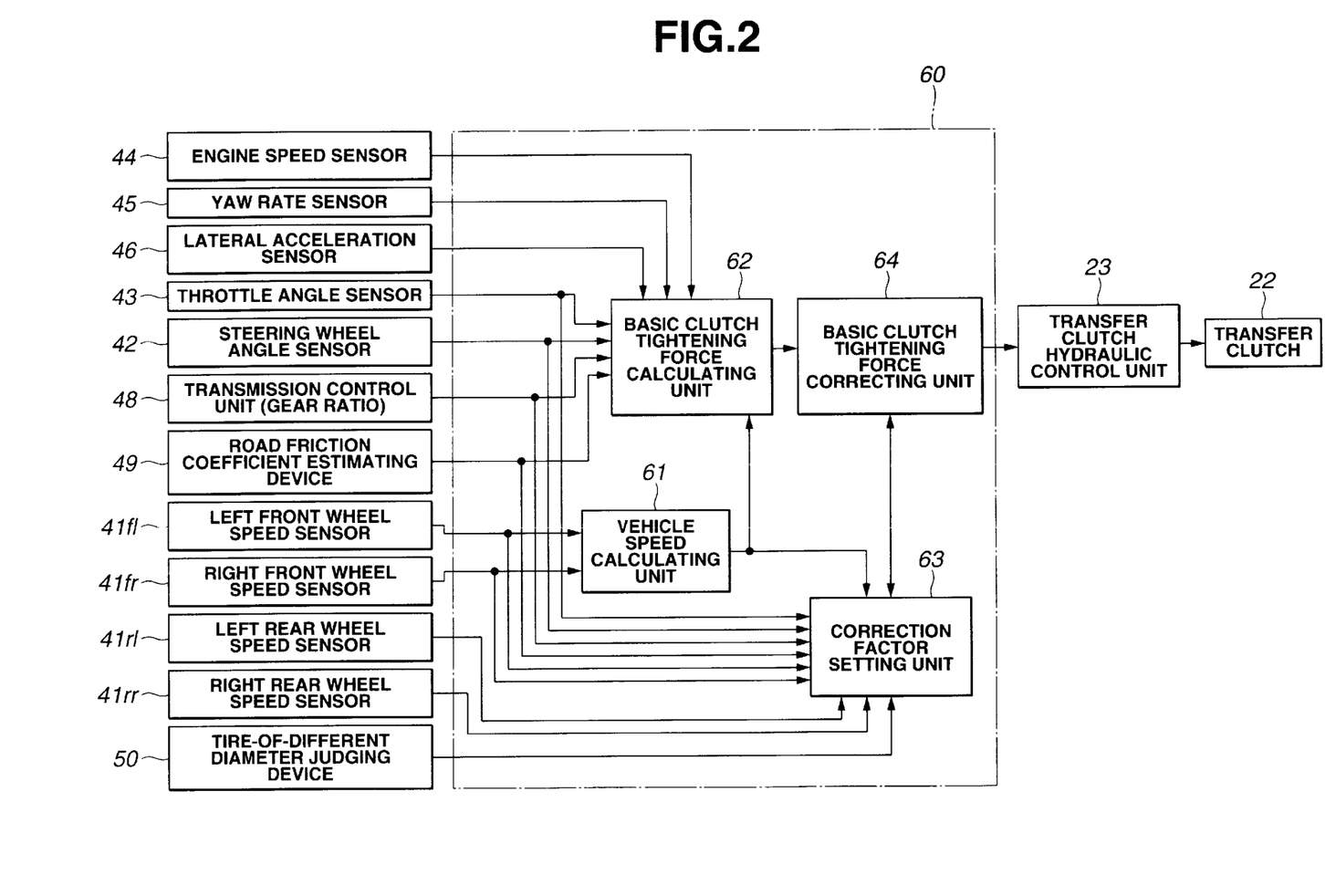
FIG. 2 is a functional block diagram showing a front-rear traction distribution control unit.

The front-rear traction control unit 60 is composed of a microcomputer and its peripheral circuits. As shown in FIG. 2, the front-rear traction control unit 60 consists mainly of a vehicle speed calculating unit 61, a basic clutch tightening force-for-transfer clutch calculating unit 62, a correction factor-for-transfer clutch setting unit 63, and a basic clutch tightening force-for-transfer clutch correcting unit 64.

The wheel speed sensors 41fl, 41fr, 41rl, and 41rr, a steering wheel angle sensor 42, a throttle angle sensor 43, an engine speed sensor 44, a yaw rate sensor 45, a lateral acceleration sensor 46, a transmission control unit 48, a road friction coefficient estimating device 49, and a tire with different diameters judging device 50 are connected to the front-rear traction distribution control unit 60. The wheel speeds ωfl, ωfr, ωrl, and ωrr, the steering wheel angle θH, the throttle angle θth, the number of engine revolutions Ne, the yaw rate γ, the lateral acceleration Gy, the gear ratio i, the road friction coefficient $\mu$, and a result of judgment on whether tires with different diameters are attached are transmitted to the front-rear traction control unit 60.

Based on the input signals, a front-rear traction control program that will be described later is run in order to determine a basic clutch tightening force Fotb as optimal tightening force to be exerted in tightening the transfer clutch 22. The basic clutch tightening force Fotb is then outputted to the transfer clutch hydraulic control unit 23.

The vehicle speed calculating unit 61 receives the wheel speed ωfl of the left front wheel and the wheel speed ωfr of the right[]front from the left front wheel speed sensor 41fl and right front wheel speed sensor 41fr respectively. An average of the left front wheel speed ωfl and right front wheel speed ωfr is calculated as a vehicle speed V, and transmitted to the basic clutch tightening force-for-transfer clutch calculating unit 62 and to the correction factor setting unit 63.

The basic clutch tightening force calculating unit 62 receives the steering wheel angle θH, the throttle angle θth, the number of engine revolutions Ne, the yaw rate γ, the lateral acceleration Gy, the gear ratio i, the road friction coefficient $\mu$, and the vehicle speed V from the steering wheel angle sensor 42, the throttle angle sensor 43, the engine speed sensor 44, the yaw rate sensor 45, the lateral acceleration sensor 46, the transmission control unit 48, the road friction coefficient estimating device 49, and the vehicle speed calculating unit 61 respectively.

The basic clutch tightening force calculating unit 62 references a preset map to retrieve clutch torque VTDout0 required for tightening the clutch, which is adopted as a base, in association with the road friction coefficient $\mu$.

The basic clutch tightening force calculating unit 62 then corrects the base clutch torque VTDout0 in relation to input torque Ti, a deviation of the yaw rate γ from a target yaw rate γt, and the lateral acceleration Gy. The input torque Ti (calculated using the number of engine revolutions Ne and gear ratio i) is transmitted to the center differential 4. The target yaw rate γt is calculated by using the throttle angle θth, the yaw rate γ, the steering wheel angle θH, and the vehicle speed V. Consequently, control output torque VTDout is calculated and used as a base of basic clutch tightening force Fotb that is exerted in order to distribute driving forces among the front wheels and rear wheels.

Furthermore, the basic clutch tightening force calculating unit 62 corrects the control output torque VTDout according to the steering wheel angle θ. The resultant torque dependent on the steering wheel angle is determined as the basic clutch tightening force Fotb to be exerted in tightening the transfer clutch 22, and transmitted to the basic clutch tightening force correcting unit 64.

In short, the basic clutch tightening force calculating unit 62 is included as a basic clutch tightening forth calculating means.

The correction factor setting unit 63 receives the wheel speeds ωfl, ωfr, ωrl, and ωrr, steering wheel angle θH, throttle angle θth, gear ratio i, road friction coefficient $\mu$, result of judgment made on whether tires with different diameters are attached, and vehicle speed V from the wheel speed sensors 41fl, 41fr, 41rl, and 41rr, steering wheel angle sensor 42, throttle angle sensor 43, transmission control unit 48, road friction coefficient estimating device 49, tire with different diameter judging device 50, and vehicle speed calculating unit 61 respectively.

The correction factor setting unit 63 corrects a correction factor (coefficient) Ktc relevant to the transfer clutch, which is set in the basic clutch tightening force correcting unit 64, according to a correction coefficient setting routine. The resultant correction coefficient value is newly set in the basic clutch tightening force correcting unit 64.

The correction factor setting unit 63 calculate as a difference in an actual revolution speed Δωfr (=ωr−ωf) the difference between the actual revolution speed of the front driving axle ωf (=(ωfl+ωfr)/2, that is, the vehicle speed V in the present embodiment) and the actual revolution speed of the rear driving axle ωr (=(ωrl+ωrr)/2)

Figure 3:
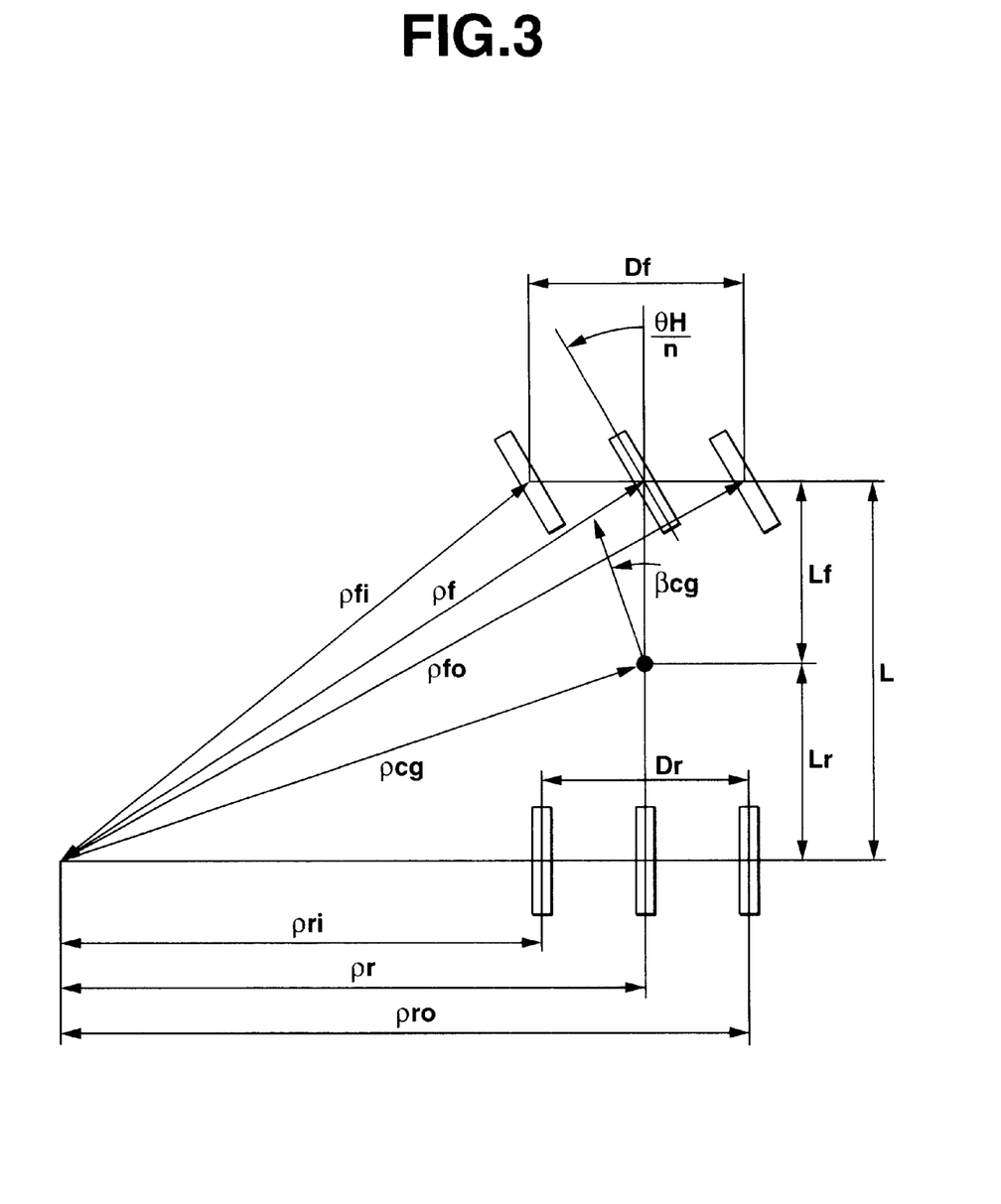
FIG. 3 is an explanatory diagram concerning calculation of a reference revolution speed.

Moreover, the correction factor setting unit 63 calculates, as shown in FIG. 3, as a difference in a reference revolution speed Δωfr0 (=ωr0−ωf0) the difference between the ideal (reference) revolution speed of the front driving axle ωf0 (calculated according to formula (7) or (23)) and the ideal (reference) revolution speed of the rear driving axle ωr0 (calculated according to formula (8) or (24)).

Based on the difference in an actual revolution speed Δωfr and the difference in a reference revolution speed Δωfr0, the correction factor-for-transfer clutch setting unit 63 corrects the correction coefficient Ktc (previous correction coefficient value) relevant to the transfer clutch as described below. The correction coefficient Ktc has been set in the basic clutch tightening force correcting unit 64. The resultant correction coefficient value is newly set in the basic clutch tightening force correcting unit 64. The correction coefficient value Ktc relevant to the transfer clutch is initialized to 1.

(1) When the difference in an actual revolution speed Δωfr is smaller than the difference in a reference revolution speed Δωfr0 by a preset set value (threshold) ωc1 or more, the correction coefficient Ktc relevant to the transfer clutch is decreased (for example, decreased 3%, that is, multiplied by 0.97).

(2) When the difference in an actual revolution speed Δωfr is larger than the difference in a reference revolution speed Δωfr0 by a preset set value (threshold) ωc2, the correction coefficient Ktc relevant to the transfer clutch is increased (for example, increased by 3%, that is, multiplied by 1.03).

(3) In any other case, the correction coefficient Ktc relevant to the transfer clutch is not corrected.

Incidentally, when the conditions described below are met, the correction factor setting unit 63 does not correct the correction coefficient Ktc, that is, inhibits the correction of the correction coefficient Ktc relevant to the transfer clutch.

(a) When the road friction coefficient $\mu$ is smaller than a preset threshold $\mu k$, there is a possibility that the wheels may slip and correction may not be carried out accurately. The correction coefficient Ktc is therefore not corrected.

(b) If the throttle angle θth is larger than a preset threshold θthc, that is, if the power generated by the engine 2 is large, there is a possibility that the wheels may slip and correction may not be carried out accurately. The correction coefficient Ktc is therefore not corrected. Incidentally, as long as it can be judged from the criterion whether the power generated by the engine 2 is large, any other parameter (for example, an accelerator pedal angle) may be adopted as a criterion. The preset threshold θthc may be varied depending on the road friction coefficient $\mu A$. In this case, for example, the smaller the road friction coefficient $\mu$, the smaller the threshold θthc.

(c) When tires with different diameters such as temporary tires are attached to the vehicle 1, the wheel speeds are different from those attained normally. In this case, since the correction will not be carried out accurately, the correction coefficient Ktc is not corrected.

As mentioned above, the correction factor setting unit 63 has the functions of an actual revolution speed difference calculating means, a reference revolution speed difference calculating means, and a correction coefficient setting means.

Moreover, the ideal revolution speeds are expressed by using geometric variables shown in FIG. 3 as described below.

Assuming that the vehicle 1 is turned at a low speed (for example, 20 km per hour or less), a turning radius relevant to the front driving axle, $\rho f$, and the turning radius relevant to the rear driving axle, $\rho r$, are expressed by using the geometric variables as follows:

$$\rho f = L/(\sin(\theta H/n)) \tag{1}$$

$$\rho r = L/(\tan(\theta H/n)) \tag{2}$$

The radius of a turning circle traced by the front outer wheel when the vehicle makes a turn $\rho of$ is expressed as follows:

$$\rho of = \rho f + (Df/2) \cdot (\cos(\theta H/n)) \tag{3}$$

The radius of the turning circle traced by the front inner wheel when the vehicle makes the turn $\rho fi$ is expressed as follows:

$$\rho fi = \rho f - (Df/2) \cdot (\cos(\theta H/n)) \tag{4}$$

The radius of the turning circle traced by the rear outer wheel when the vehicle turns $\omega ro$ is expressed as follows:

$$\rho ro = \rho r + (Dr/2) \tag{5}$$

The radius of the turning circle traced by the rear inner wheel when the vehicle turns $\rho ri$ $\rho$ $ri$ is expressed as follows:

$$\rho ri = \rho r - (Dr/2) \tag{6}$$

where L denotes a wheel base, Df denotes the area of the tread of the front wheel, Dr denotes the area of the tread of the rear wheel, and n denotes a steering gear ratio.

Assuming that an average wheel speed of the two front wheels is detected to equal V, the reference revolution speed of the front driving axle $\omega f$ and the reference revolution speed of the rear driving axle $\omega r0$ are expressed as follows:

$$\omega f0 = V \tag{7}$$

$$\omega r0 = V \cdot (\rho r/\rho f) \tag{8}$$

The reference wheel speed of the front outer wheel $\omega fo0$, attained when the vehicle is turned is expressed as follows:

$$\omega of0 = V \cdot (\rho of/\rho f) \tag{9}$$

The reference wheel speed of the front inner wheel $\omega fi0$, attained when the vehicle is turned is expressed as follows:

$$\omega fi0 = V \cdot (\rho fi/\rho f) \tag{10}$$

The reference wheel speed of the rear outer wheel $\omega ro0$, attained when the vehicle turns is expressed as follows:

$$\omega ro0 = V \cdot (\rho ro/\rho f) \tag{11}$$

The reference wheel speed of the rear inner wheel $\omega ri0$, attained when the vehicle turns is expressed as follows:

$$\omega ri0 = V \cdot (\rho ri/\rho f) \tag{12}$$

The vehicle speed may not be limited to a low speed, but the above expressions may be resolved by using a kinetic model of a vehicle. In this case, assuming that the vehicle speed V is calculated by using an average wheel speed of the four wheels or an average revolutional speed of the front and the rear driving axles, the following expressions that provide the turning radius of the vehicle $\rho cg$ that is the radius of the turning circle traced by the center of gravity in the vehicle and a slip angle detected at the center of gravity of the vehicle, $\beta cg$, may be employed:

$$\rho cg = (1 + A \cdot V^2) \cdot (L/(\theta H/n)) \tag{13}$$

$$\mu cg = ((1 - (m/(2 \cdot L)) \cdot (Lf/(Lr \times Kr)) \cdot V^2)/(1 + A \cdot V^2) \cdot (Lr/L) \times (\theta H/n) \tag{14}$$

where A denotes a stability factor, m denotes the mass of a vehicle, Lf denotes a distance from the front driving axle to the center of gravity, and Lr denotes a distance from the rear driving axle to the center of gravity.

A radius of gyration relevant to the front driving axle $\rho f$ and a radius of gyration relevant to the rear driving axle $\rho r$ are expressed as follows:

$$\rho f = \rho cg + Lf \cdot (\sin(\beta cg)) \tag{15}$$

$$\rho r = \rho cg - Lr \cdot (\sin(\beta cg)) \tag{16}$$

The radius of the turning circle traced by the front outer wheel when the vehicle turns $\rho of$ is expressed as follows:

$$\rho of = \rho f + (Df/2) \cdot (\cos(\beta f)) \tag{17}$$

The radius of the turning circle traced by the inner front wheel when the vehicle turns $\rho fi$ is expressed as follows:

$$\rho fi = \rho f - (Df/2) \cdot (\cos(\beta f)) \tag{18}$$

where Bf denotes a slip angle exhibited by the front driving axle.

$$\beta f = \beta cg + (Lf/\rho cg) \tag{19}$$

The radius of the turning circle traced by the rear outer wheel when the vehicle turns $\rho ro$ is expressed as follows:

$$\rho ro = \rho r + (Dr/2) \cdot (\cos(\beta r)) \tag{20}$$

The radius of the turning circle traced by the rear inner wheel when the vehicle turns $\rho ri$ is expressed as follows:

$$\rho ri = \rho r - (Dr/2) \cdot (\cos(\beta r)) \tag{21}$$

where $\beta r$ denotes a slip angle exhibited by the rear driving axle.

$$\beta r = \beta cg - (Lr/\rho cg) \tag{22}$$

Consequently, the reference revolution speed of the front driving axle $\omega f0$, and the reference revolution speed of the rear driving axle $\omega r0$, are expressed as follows:

$$\omega f0 = V \cdot (\rho f/\rho cg) \tag{23}$$

$$\omega r0 = V \cdot (\rho r/\rho cg) \tag{24}$$

The reference wheel speed of the front outer wheel attained when the vehicle turns $\omega fo0$ is expressed as follows:

$$\omega fo0 = V \cdot (\rho fo/\rho cg) \tag{25}$$

The reference wheel speed of the front inner wheel attained when the vehicle turns $\omega fi0$ is expressed as follows:

$$\omega fi0 = V \cdot (\rho fi/\rho cg) \tag{26}$$

The reference wheel speed of the rear outer wheel attained when the vehicle turns $\omega ro0$ is expressed as follows:

$$\omega ro0 = V \cdot (\rho ro/\rho cg) \tag{27}$$

The reference wheel speed of the rear inner wheel attained when the vehicle turns ωri0 is expressed as follows:

$$\omega ri0 = V \cdot (\rho ri/\rho cg) \quad (28)$$

The basic clutch tightening force Fotb is inputted from the basic clutch tightening force calculating unit 62 to the basic clutch tightening force correcting unit 64.

Moreover, a correction coefficient Ktc relevant to the transfer clutch that has been corrected is transmitted from the correction factor setting unit 63. The basic clutch tightening force Fotb is corrected according to the expression (formula)(29) below. The resultant basic clutch tightening force Fotb is outputted to the transfer clutch hydraulic control unit 23.

In short, the basic clutch tightening force correcting unit 64 is included as a basic clutch tightening force correcting means.

$$Fotb = Ktc \cdot Fotb \quad (29)$$

The correction factor setting unit 63 may correct a map which the basic clutch tightening force correcting unit 64 references to convert the basic clutch tightening force Fotb into an output signal.

Figure 4:
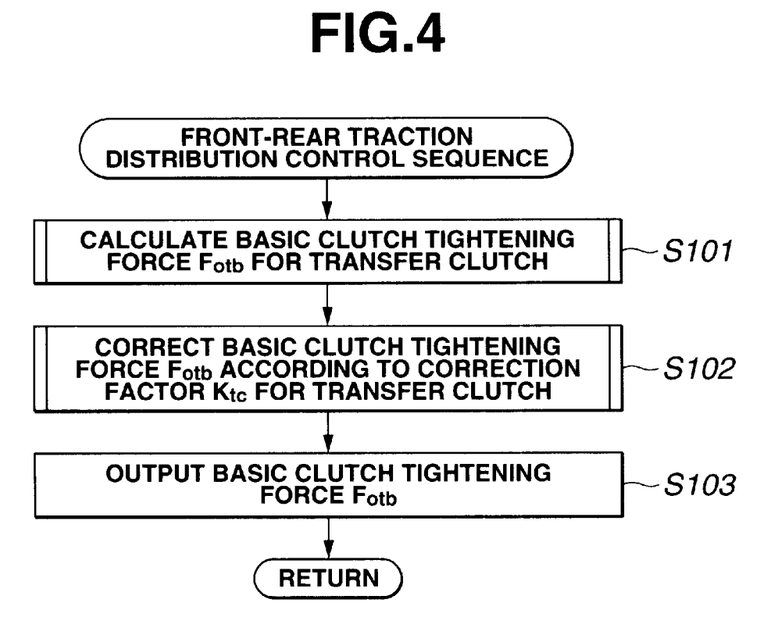
FIG. 4 is a flowchart describing a front-rear traction distribution control program.

Next, a front-rear traction control program to be run by the traction control unit 60 will be described in conjunction with the flowchart of FIG. 4. At step S101, the basic clutch tightening force calculating unit 62 calculates the basic clutch tightening force Fotb by using a steering wheel angle θH, a throttle angle θth, the number of engine revolutions Ne, a yaw rate γ, a lateral acceleration Gy, a gear ratio i, a road friction coefficient μ, and a vehicle speed V.

At step S102, the basic clutch tightening force correcting unit 64 uses a correction coefficient Ktc relevant to the transfer clutch, which is corrected by the correction factor setting unit 63, to correct the basic clutch tightening force Fotb according to the expression (equation) (29).

At step S103, the basic clutch tightening force correcting unit 64 outputs the corrected basic clutch tightening force Fotb to the transfer clutch control unit 23.

Figure 5:
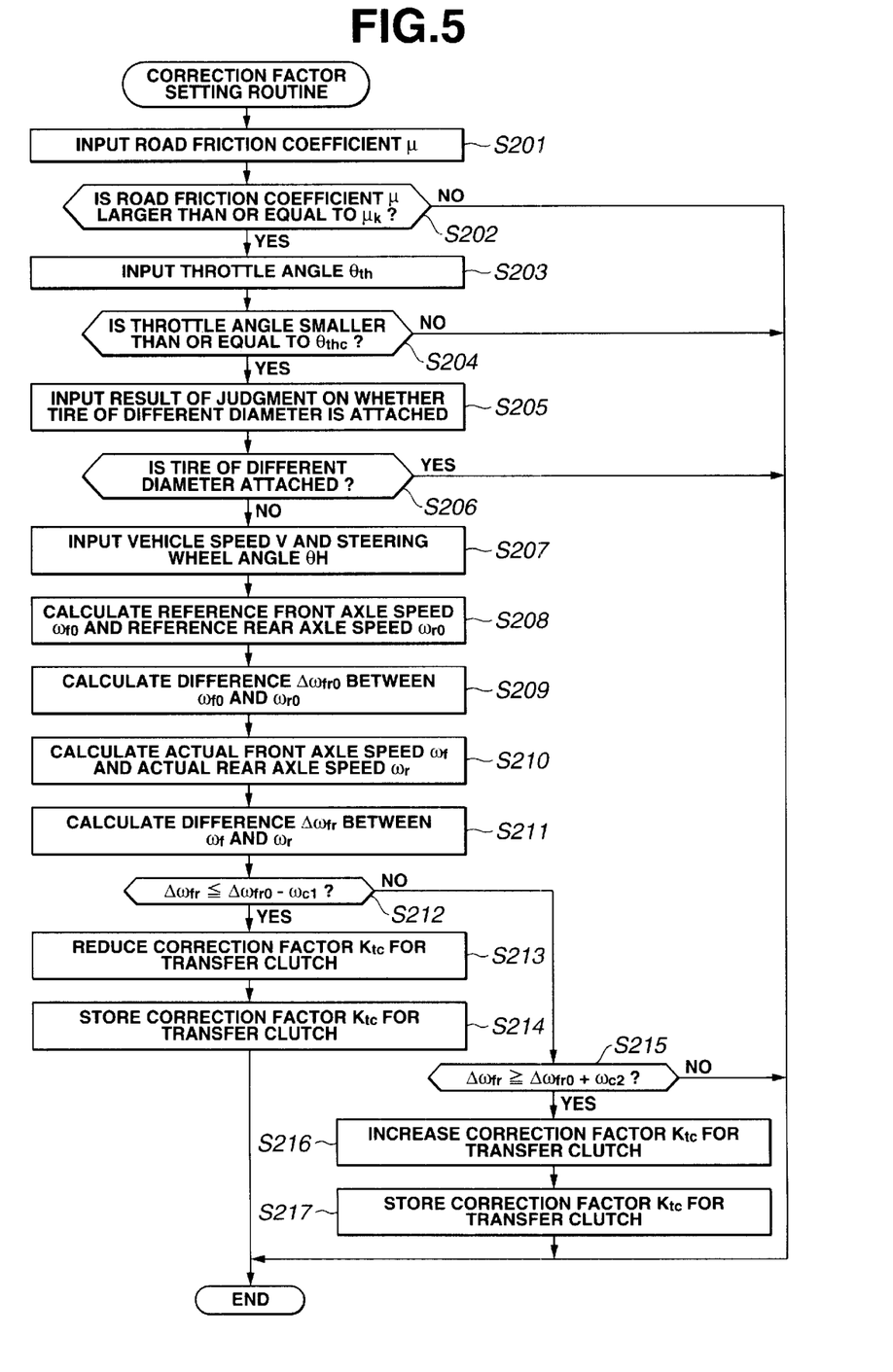
FIG. 5 is a flowchart describing a correction coefficient-for-transfer clutch setting routine.

Referring to FIG. 5, a correction coefficient setting routine to be run by the correction factor setting unit 63 first receives the road friction coefficient μ from the road friction coefficient estimating device 49 at step S201.

Thereafter, at step S202, it is judged whether the road friction coefficient μ is equal to or larger than a reset threshold μk.

If it is judged at step S202 that the road friction coefficient μ is equal to or larger than the threshold μk, control is passed to step S203.

In contrast, if it is judged at step S202 that the road friction coefficient μ is smaller than the threshold μk, there is a possibility that the wheels may slip and correction may not be carried out accurately. The correction coefficient will therefore not be corrected, but the routine terminates.

At step S203, the correction factor setting unit 63 inputs the throttle angle θth from the throttle angle sensor 43. The control is then passed to step S204. It is judged whether the throttle angle θth is smaller than a preset threshold θthc.

If it is judged at step S204 that the throttle angle θth is smaller than the reset threshold θthc, the control is passed to step S205. In contrast, if the throttle angle θth is larger than the reset threshold θthc, that is, if the power outputted by the engine may be large, there is a possibility that the wheels may slip and the correction may not be carried out accurately. The correction coefficient will therefore not be corrected, but the routine terminates.

At step S205, the correction factor setting unit 63 inputs a result of-judgment, which is made on whether tires of the different diameters such as temporary tires are attached, from the tire with different diameter judging device 50. Thereafter, the control is passed to step S206, and it is judged whether the tires of the different diameter are attached.

If it is judged at step S206 that the tires of the different diameters are not attached, the control is passed to step S207. In contrast, if it is judged at step S206 that the tires of the different diameters are attached, the wheel speeds are different from those attained with normal operations. The correction cannot be carried out correctly. The correction coefficient will therefore not be corrected, but the routine terminates.

The foregoing steps S201 to S206 are the steps that the correction factor setting unit 63 follows to judge whether the correction coefficient Ktc relevant to the transfer clutch should be corrected. By following the steps, the correction coefficient Ktc relevant to the transfer clutch can be corrected accurately.

Thereafter, the control is passed to step S207. The correction factor setting unit 63 inputs the vehicle speed V from the vehicle speed calculating unit 61 and the steering wheel angle θH from the steering wheel sensor 42, and passes the control to step S208. The reference revolution speed ωf0 of the front driving axle is calculated according to the expression (7) (or (23)), and the reference revolution speed ωr0 of the rear driving axle is calculated according to the expression (8) (or (24)).

The control is then passed to step S209. The correction factor setting unit 63 calculates the difference in a reference revolution speed, Δωfr0 (=ωr0−ωf0) between the front and rear driving axles using the reference revolution speed ωf of the front driving axle and the reference revolution speed ωr0 of the rear driving axle.

The control is then passed to step S210. The correction factor setting unit 63 receives the actual revolution speed ωf (=vehicle speed V) of the front driving axle and the actual revolution speed ωr (=(ωrl+ωrr)/2)) of the rear driving axle.

Thereafter, the control is passed to step S211. The correction factor setting unit 63 calculates the difference in an actual revolution speed between the front and rear driving axles, Δωfr (=ωr−ωf), using the actual revolution speed ωf of the front driving axle and the actual revolution speed ωr of the rear driving axle.

If it is judged at step S212 that the difference in an actual revolution speed between the front and rear driving axles Δωfr, is smaller than the difference in a reference revolution speed between the front and rear driving axles, Δωfr0, by a reset set value (threshold) ωc1 or more, control is passed to step S213. The correction factor setting unit 63 decreases the correction coefficient Ktc relevant to the transfer clutch (for example, decreases the correction coefficient by 3%, that is, multiplies it by 0.97). The control is then passed to step S214. The correction factor setting unit 63 stores the correction coefficient Ktc relevant to the transfer clutch in a memory included in the basic clutch tightening force correcting unit 64. The routine then terminates.

In contrast, if it is judged at step S212 that the difference in an actual revolution speed between the front and rear driving axles Δωfr is not smaller than the difference in a reference revolution speed between the front and rear driving axles Δωfr0 by the reset set value (threshold) ωc1, control is passed to step S215.

At step S215, the difference in an actual revolution speed between the front and rear driving axles Δωfr is compared with the difference in a reference revolution speed between the front and rear driving axles. If the difference in an actual revolution speed between the front and rear driving axles $\Delta\omega fr$ is larger than the difference in a reference revolution speed between the front and rear driving axles by diving axles by a present set value (threshold) $\omega c2$, the correction coefficient Ktc relevant to the transfer clutch is increased (for example, increased by 3%, that is, multiplied by 1.03).

The control is then passed to step S217. The correction factor setting unit 63 stores the correction coefficient Ktc relevant to the transfer clutch in a memory included in the basic clutch tightening force correcting unit 64. The routine then terminates.

If it is judged at step S215 that the difference in an actual revolution speed between the front and rear driving axles $\Delta\omega fr$ is not larger than the difference in a reference revolution speed between the front and rear driving axles $\Delta\omega fr0$ by the preset set value (threshold) $\omega c2$, the routine terminates.

As mentioned above, according to the present embodiment, the basic clutch tightening force Fotb calculated by the basic clutch tightening force calculating unit 62 is corrected based on the previous value owing to the correction factor setting unit 63 and the basic clutch tightening force correcting unit 64. The clutch tightening force to be exerted in tightening the transfer clutch 22 can be precisely set to an appropriate value in consideration of a difference in the properties of a clutch from one product to another or a time-sequential change in the properties thereof. As a result, it is unnecessary to mount a torque sensor or the like on the front and rear driving axles.

Figure 6:
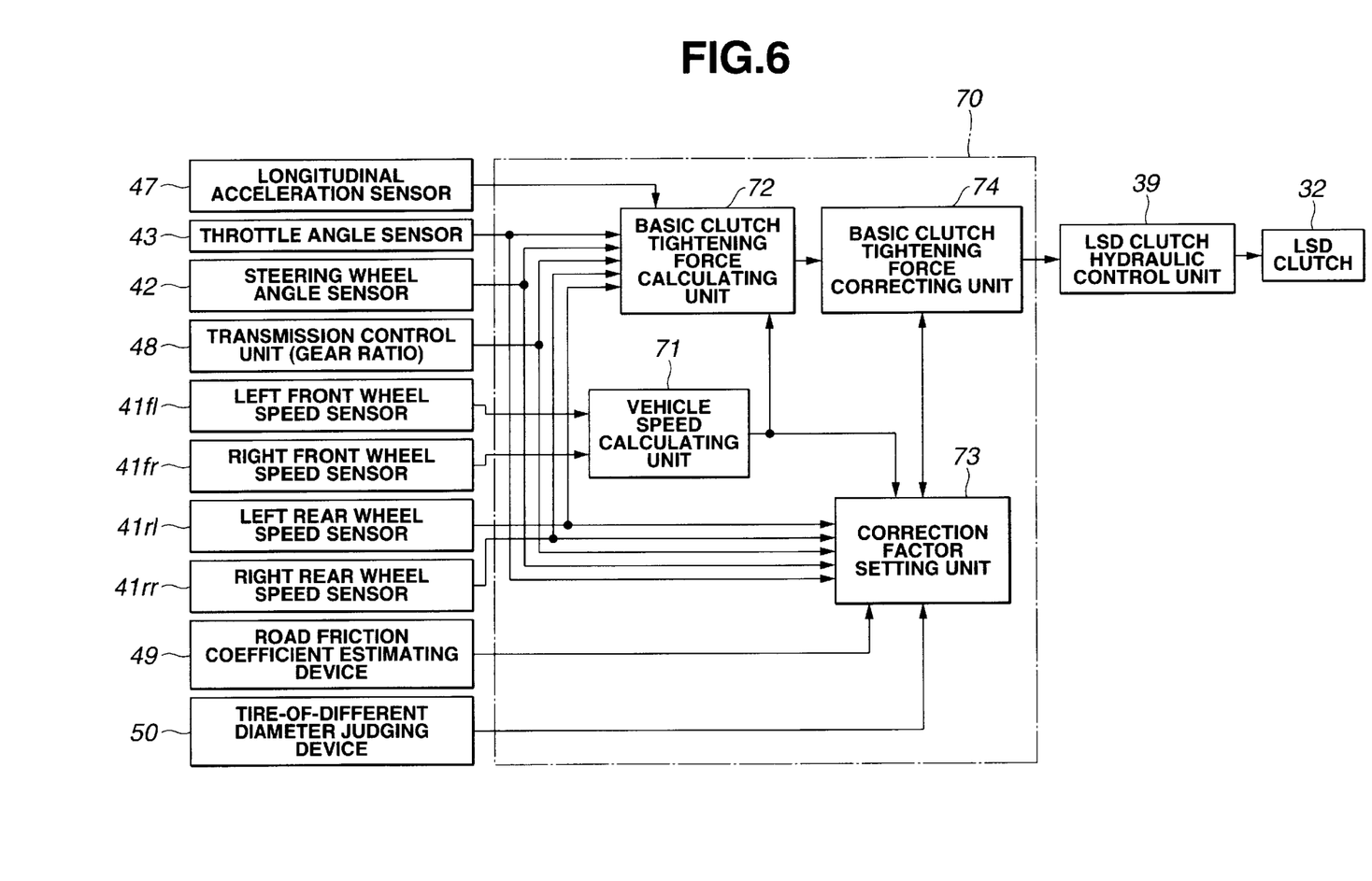
FIG. 6 is a functional block diagram showing a limited slip differential-for-right and left rear wheels control unit.

On the other hand, the limited slit differential control unit 70 consists mainly of a microcomputer and its peripheral circuits. As shown in FIG. 6, the limited slit differential control unit 70 consists mainly of a vehicle speed calculating unit 71, a basic clutch tightening force calculating unit 62, a correction factor setting unit 73, and a basic clutch tightening force correcting unit 74.

The wheel speed sensors 41fl, 41fr, 41rl, and 41rr, the steering wheel angle sensor 42, the throttle angle sensor 43, the longitudinal acceleration sensor 47, the transmission control unit 48, the road friction coefficient estimating device 49, and the tire with different diameter judging device 50 are connected to the limited slit differential control unit 70. The wheel speeds $\omega fl$, $\omega fr$, $\omega rl$, and $\omega rr$, steering wheel angle $\theta H$, throttle angle $\theta th$, longitudinal acceleration Gx, gear ratio i, road friction coefficient $\mu$, and the result of the judgment made on whether the tire with the different diameter are transmitted to the limited slit differential control unit 70.

Based on the input signals, the limited slit differential control unit 70 executes a limited slit differential control program that will be described later. Thus, the limited slit differential control unit 70 sets a basic clutch tightening force FLSD as an optimal tightening force to be exerted for tightening the LCD clutch 32, and outputs the basic clutch tightening force $F_{LSD}$ to the LSD clutch control unit 39.

The vehicle speed calculating unit 71 inputs the wheel speed of the left front wheel $\omega f1$ and the wheel speed of the right front wheel $\omega fr$ from the left front wheel speed sensor 41fl and right front wheel speed sensor 41fr, respectively. The vehicle speed calculating unit 71 calculates as a vehicle speed V an average of the left front wheel speed $\omega fl$ and right front wheel speed $\omega fr$, and outputs the vehicle speed V to the basic clutch tightening force calculating unit 72 and to the correction factor setting unit 73.

The basic clutch tightening force calculating unit 72 inputs the wheel speeds of the right and left rear wheels $\omega rl$ and $\omega rr$, the steering wheel angle $\theta H$, the throttle angle $\theta th$, the longitudinal acceleration Gx, the gear ratio i, and the vehicle speed V from the right and left rear wheel speed sensors 41rr and 41rl, the steering wheel angle sensor 42, the throttle angle sensor 43, the longitudinal acceleration sensor 47, the transmission control unit 48, and the vehicle speed calculating unit 71, respectively.

The basic clutch tightening calculating unit 72 calculates, for example, a difference in a wheel speed between the rear wheels using the left rear wheel speed curl and right rear wheel speed $\omega rr$. If the difference in a wheel speed between the rear wheels is equal to or larger than a preset reference value, it is judged that the right and left rear wheels slip. If the difference in a wheel speed between the rear wheels is smaller than the preset reference value, it is judged that the right and left rear wheels do not slip.

If the rear wheels slip, the basic clutch tightening force calculating unit 72 determines the basic clutch tightening force $F_{LSD}$ in relation to the steering wheel angle $\theta H$ by referencing preset map that contains a set of values theoretically calculated and/or experimentally determined. Moreover, if the rear wheels do not slip, the basic clutch tightening force calculating unit 72 determines the basic clutch tightening force $F_{LSD}$ suitable for the state of the vehicle of which the rear wheels do not slip.

The basic clutch tightening force $F_{LSD}$ suitable for the state of the vehicle of which the rear wheels do not slip is determined by retrieving an oil pressure from a map in relation to the vehicle speed V and throttle angle $\theta th$. A set of the values contained in the map are experimentally determined and/or theoretically calculated, and the larger values are specified in association with the higher speeds and the larger loads. The oil pressure is then corrected with the gear ratio set to a value associated with a low vehicle speed, and further corrected based on the longitudinal acceleration Gx. The basic clutch tightening force calculating unit 72 is included as a basic clutch tightening force calculating means.

The correction factor setting unit 73 inputs the right and left rear wheel speeds $\omega rr$ and $\omega rl$, the steering wheel angle $\theta H$, the throttle angle $\theta th$, the gear ratio i, the road friction coefficient $\mu$, the result of judgment made on whether the tires of the different diameters are attached, and vehicle speed V from the right and left rear wheel speed sensors 41rr and 41rl, the steering wheel angle sensor 42, the throttle angle sensor 43, the transmission control unit 48, the road friction coefficient estimating device 49, the tire-of-different diameter judging device 50, and the vehicle speed calculating unit 71 respectively.

According to a coefficient correction setting routine to be described later, the correction factor (coefficient) $K_{LSD}$ relevant to the LSD clutch set in the basic clutch tightening force correcting unit 74 is corrected. The resultant correction coefficient is newly set in the basic clutch tightening force correcting unit 74.

For example, when the vehicle 1 turns leftwards, the coefficient correction setting unit determines the actual wheel speed of the left rear wheel $\omega rl$, as the actual wheel speed of the rear inner wheel $\omega ri$, and determines the actual wheel speed of the right rear wheel $\omega rr$, as the actual wheel speed of the rear outer wheel $\omega ro$. The difference between the actual wheel speed of the rear inner wheel $\omega ri$, and the actual wheel speed of the rear outer wheel $\omega ro$, is calculated as the difference in an actual wheel speed between the right and left rear wheels $\Delta\omega r$ ($=\omega ri - \omega ro$)

Moreover, the correction factor setting unit 73 calculates as a difference in a reference wheel speed between the right and left rear wheels $\Delta\omega r0$ ($=\omega ri0-\omega ro0$), the difference between the ideal (reference) wheel speed of the rear inner wheel (calculated according to the expression (equation) (12) or (28) and the ideal (reference) wheel speed of the rear outer wheel (calculated according to the expression (equation) (11) or (27)). The ideal wheel speeds to be attained when the vehicle turns are calculated according to the aforesaid expressions in consideration of the differences in the radius of a turning circle among the wheels.

Moreover, the correction factor setting unit 73 corrects the correction coefficient $K_{LSD}$ relevant to the LSD clutch (previous correction coefficient value relevant to the LSD clutch) according to the difference in an actual wheel speed between the right and left rear wheels $\Delta\omega r$, and the difference in a reference wheel speed between the right and left rear wheels $\Delta\omega r0$ as described below. The correction coefficient $K_{LSD}$ relevant to the LSD clutch is set in the basic clutch tightening force correcting unit 74. The correction factor setting unit 73 then newly sets the resultant correction coefficient KLsd in the basic clutch tightening force correcting unit 74. Incidentally, the correction coefficient KLsd relevant to the LSD clutch is initialized to 1.

(1) When the difference in an actual wheel speed $\Delta\omega r$ is smaller than the difference in a reference wheel speed $\Delta\omega r0$ by a preset set value (threshold) $\omega c3$ or more, the correction coefficient $K_{LSD}$ relevant to the LSD clutch is decreased (for example, decreased by 3%, that is, multiplied by 0.97).

(2) When the difference in an actual wheel speed $\Delta\omega r$ is larger than the difference in a reference wheel speed $\Delta\omega r0$ by a preset set value (threshold) $\omega c4$ or more, the correction coefficient $K_{LSD}$ relevant to the LSD clutch is increased (for example, increased by 3%, that is, multiplied by 1.03).

(3) In any other case, the correction coefficient $K_{LSD}$ relevant to the LSD clutch is not corrected.

The correction factor setting unit 73 does not correct the correction coefficient $K_{LSD}$, that is, inhibits the correction of the correction coefficient $K_{LSD}$ relevant to the LSD clutch when the conditions described below are met.

(a) When the road friction coefficient $\mu$ is smaller than a preset threshold $\mu k$, there is a possibility that the wheels may slip and correction may not be achieved accurately. The correction coefficient will therefore not be corrected.

(b) When the throttle angle $\theta th$ is larger than a preset threshold $\theta thc$, or when power generated by the engine is large, there is a possibility that the wheels may slip and correction may not be achieved accurately. The correction coefficient will therefore not be corrected.

As long as it can be judged whether power generated by the engine is large, any other parameter (for example, an accelerator pedal angle) may be adopted as a criterion. The preset threshold $\theta thc$ may be varied depending on the road friction coefficient $\mu$. In this case, for example, the threshold $\theta thc$ is set to a smaller value when the friction coefficient $\mu$ is smaller.

(c) When tires of the different diameters such as temporary tires are attached to the vehicle 1, the wheel speeds are different from those attained with ordinary tires attached thereto. Consequently, the correction is not achieved accurately. The correction coefficient will therefore not be corrected.

As mentioned above, the correction factor setting unit 73 performs the roles of a difference speed calculating means, a difference revolution speed calculating means, and a correction coefficient setting means.

Moreover, the basic clutch tightening force correcting unit 74 inputs the basic clutch tightening force $F_{LSD}$ from the basic clutch tightening force calculating unit 72.

Moreover, the basic clutch tightening force correcting unit 74 inputs the corrected correction coefficient $K_{LSD}$ relevant to the LSD clutch from the correction factor setting unit 73, and corrects it by resolving the expression (30) presented below. The resultant basic clutch tightening force $F_{LSD}$ is then outputted to the LSD clutch hydraulic control unit 39.

The basic clutch tightening force correcting unit 74 is included as a basic clutch tightening force correcting means.

$$F_{LSD}=K_{LSD}\cdot F_{LSD} \tag{30}$$

Incidentally, the correction factor setting unit 73 may correct a map which the basic clutch tightening force correcting unit 74 makes reference to convert the basic clutch tightening force $F_{LSD}$ into an output signal.

Figure 7:
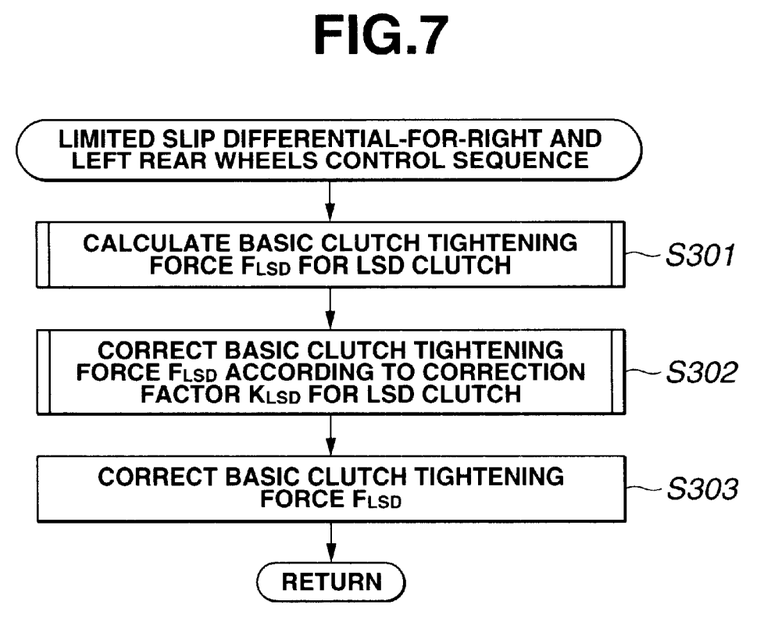
FIG. 7 is a flowchart describing a limited slip differential-for-right and left rear wheels control program.

Next, a limited slip differential control program to be run (executed) by the limited slip differential control unit 70 will be described with reference to the flowchart of FIG. 7. First, at step S301, the basic clutch tightening force calculating unit 72 calculates the basic clutch tightening force $F_{LSD}$ by using the wheel speeds of the right and left rear wheels $\omega rr$ and $\omega rl$, the steering wheel angle $\theta H$, the throttle angle $\theta th$, the longitudinal acceleration Gx, the gear ratio i, and the vehicle speed V.

The control is then passed to step S302. The basic clutch tightening force correcting unit 74 uses the correction coefficient $K_{LSD}$ relevant to the LSD clutch, which is corrected by the correction factor setting unit 73, to correct the basic clutch tightening force $F_{LSD}$ by resolving the expression (formula) (30).

The control is then passed to step S303. The resultant basic clutch tightening force $F_{LSD}$ is outputted to the LSD clutch hydraulic control unit 39.

Figure 8:
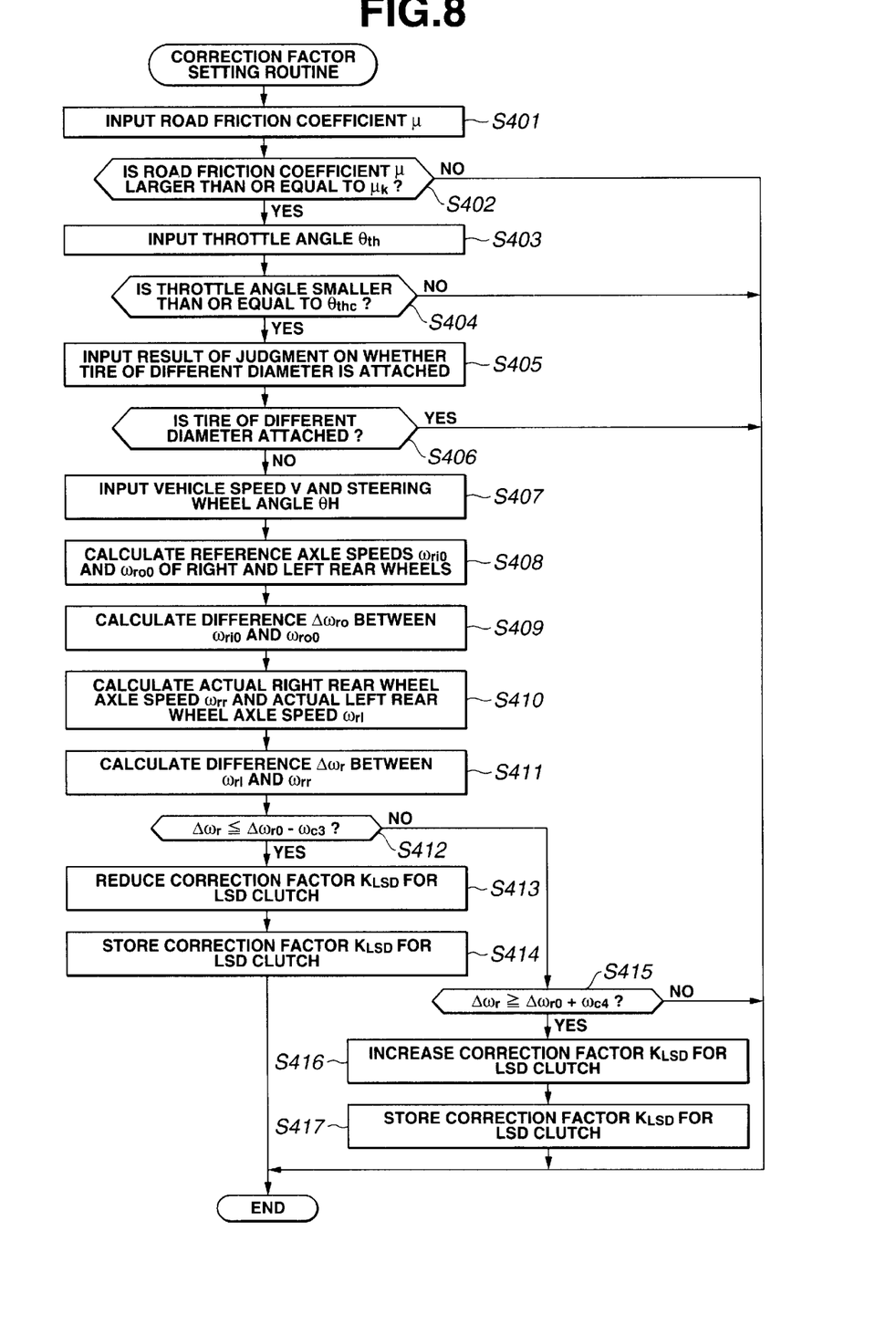
FIG. 8 is a flowchart describing a correction coefficient-for-LSD clutch setting routine.

Referring to FIG. 8, in a correction coefficient setting routine run by the correction factor setting unit 73, the road friction coefficient $\mu$ is inputted from the road friction coefficient estimating device 49 at step S401. At step S402, it is judged whether the road friction coefficient $\mu$ is equal to or larger than the preset threshold $\mu k$.

If it is judged at step S402 that the road friction coefficient $\mu$ is equal to or larger than the preset threshold $\mu k$, the control is passed to step S403. In contrast, if the road friction coefficient $\mu$ smaller than the preset threshold $\mu k$, there is a possibility that the wheels may slip and correction may not be carried out accurately. The correction coefficient will therefore not be corrected, but the routine terminates.

At step S403, the correction factor setting unit 73 inputs the throttle angle $\theta th$ from the throttle angle sensor 43.

Thereafter, the control is passed to step S404. The correction factor setting unit 73 judges whether the throttle angle is smaller than the preset threshold.

If it is judged at step S404 that the throttle angle $\theta th$ is smaller than the preset threshold $\theta thc$, control is passed to step S405. In contrast, if the throttle angle $\theta th$ is larger than the preset threshold $\theta thc$, that is, if the power outputted by the engine is large, there is a possibility that the wheels may slip and correction may not be carried out accurately. The correction factor setting unit 73 does not correct the correction coefficient, that is, inhibits the correction of the correction coefficient relevant to the LSD clutch but terminates the routine.

At step S405, the correction factor setting unit 73 inputs the result of judgment, which is made on whether tires of the different diameters such as the temporary tires are attached, from the tire-of-different diameter judging device 50. It is then judged at step S406 whether the tires of the different diameters are attached.

If it is judged at step S406 that the tires of the different diameters are not attached, control is passed to step S407. If it is judged that the tires of the different diameters are attached, the wheel speeds are different from those attained with the ordinary tires attached, and the correction cannot be carried out accurately. The correction factor setting unit 73 does not therefore correct the correction coefficient but the routine terminates.

The foregoing steps S401 to S406 are followed by the correction factor setting unit 73 in order to judge whether the correction coefficient $K_{LSD}$ relevant to the LSD clutch should be corrected. By following the steps, the correction coefficient $K_{LSD}$ relevant to the LSD clutch can be corrected accurately.

Thereafter, the control is passed to step S407. The correction factor setting unit 73 inputs the vehicle speed V and steering wheel angle θH from the vehicle speed calculating unit 71 and the steering wheel angle sensor 42, respectively.

The control is then passed to step S408. The correction factor setting unit 73 calculates the reference wheel speed of, the rear inner wheel ωri0, which is attained when the vehicle turns, according to the expression (12) (or (28)). Moreover, the correction factor setting unit 73 calculates the reference wheel speed of the rear inner wheel ωri0, which is attained when the vehicle turns, according to the expression (11) (or (27)).

The control is then passed to step S409. The correction factor setting unit 73 calculates the difference in a reference wheel speed between the right and left rear wheels Δωr0 (=ωri0−ωro0), by using the reference wheel speed of the rear inner wheel ωri0, and the reference wheel speed of the rear outer wheel ωro0. The reference wheel speeds are attained when the vehicle turns.

Thereafter, control is passed to step S410. The correction factor setting unit 73 judges from the turned state of the vehicle 1 whichever of the right and left rear wheels acts as an outer wheel or an inner wheel. The correction factor setting unit 73 then calculates the actual wheel speed of the left rear wheel ωrl, and the actual wheel speed of the right rear wheel ωrr. Herein, the actual wheel speed of the left rear wheel ωrl, corresponds to the actual wheel speed of the rear inner wheel ωri, which is attained when the vehicle turns. The actual wheel speed of the right rear wheel ωrr, corresponds to the actual wheel speed of the rear outer wheel ωro, which is attained when the vehicle turns.

Thereafter, the control is passed to step S411. The correction factor setting unit 73 then calculates the difference in an actual wheel speed between the right and left rear wheels Δωr (=ωri−ωro), by using the actual wheel speed of the rear inner wheel ωri and the actual wheel speed of the rear outer wheel ωro. The actual wheel speeds are attained when the vehicle is turned.

The control is then passed to step S412. The correction factor setting unit 73 compares the difference in an actual wheel speed between the right and left rear wheels Δωr, with the difference in a reference wheel speed between the right and left rear wheels Δωr0.

If it is judged at step S412 that the difference in an actual wheel speed between the right and left rear wheels Δωr, is smaller than the difference in a reference wheel speed between the right and left rear wheels Δωr0, by a preset set value (threshold) ωc3 or more, the control is passed to step S413. The correction factor setting unit 73 then decreases the correction coefficient $K_{LSD}$ relevant to the LSD clutch (for example, decreases it by 3%, that is, multiplies it by 0.97). The control is then passed to step S414. The correction factor setting unit 73 stores the correction coefficient $K_{LSD}$ relevant to the LSD clutch in a memory included in the basic clutch tightening force correcting unit 74 and terminates the routine.

In contrast, if it is judged at step S412 that the difference in an actual wheel speed between the right and left rear wheels Δωr, is not smaller than the difference in a reference wheel speed between the right and left rear wheels Δωr0, by the preset set value (threshold) ωc3, the control is passed to step S415.

At step S415, the correction factor setting unit 73 compares the difference in an actual wheel speed between the right and left rear wheels Δωr with the difference in a reference wheel speed between the right and left rear wheels Δωr0.

If it is judged at step S415 that the difference in an actual wheel speed between the right and left rear wheels Δωr is larger than the difference in a reference wheel speed between the right and left rear wheels Δωr by a preset set value (threshold) ωc4 or more, the control is passed to step S416. The correction factor setting unit 73 increases the correction coefficient $K_{LSD}$ relevant to the LSD clutch (for example, increases it by 3%, that is, multiplies it by 1.03).

The control is then passed to step S417. The correction factor setting unit 73 stores the correction coefficient $K_{LSD}$ relevant to the LSD clutch in a memory included in the basic clutch tightening force correcting unit 74 and terminates the routine.

If it is judged at step S415 that the difference in an actual wheel speed between the right and left rear wheels Δωr is not larger than the difference in a reference wheel speed between the right and left rear wheels Δωr0 by the preset set value (threshold) ωc4 or more, the routine is terminated.

As mentioned above, according to the present embodiment, the basic clutch tightening force $F_{LSD}$ calculated by the basic clutch tightening force calculating unit 72 is corrected based on the previous value owing to the correction factor setting unit 73 and the basic clutch tightening force correcting unit 74. Therefore, clutch tightening force to be exerted in tightening the LSD clutch 32 can be highly precisely set to an appropriate value in consideration of a difference in the properties of the clutch, a slight allowance difference of the product, and/or due to long use. As a result, it is unnecessary to mount a torque sensor or the like on the right and left driving axles.

Incidentally, the present embodiment of the present invention has been described on the assumption that the limited slip differential is controlled in connecting the right and left rear axles fixed to the right and left rear wheels. The present invention can be adapted to a system that controls a limited slip differential which connects the right and left front axles fixed to the right and left front wheels.

Moreover, according to the present embodiment, the center differential 4 and the limited slip differential included in the rear-wheels final reduction device 8 are realized with a complex planetary gear train. Alternatively, they may be realized with a bevel gear box or a planetary gear train including a ring gear.

Moreover, the method according to which the front-rear traction control unit 60 calculates the basic clutch tightening force Fotb to be exerted in tightening the transfer clutch 22 is not limited to the aforesaid one employed in the present embodiment. Moreover, the method according to which the limited slip differential control unit 70 calculates the basic clutch tightening force $F_{LSD}$ to be exerted in tightening the LSD clutch 32 is not limited to the aforesaid one employed in the present embodiment.

As described so far, according to the present invention, clutch tightening force can be highly precisely set to an appropriate value in consideration of a difference in the properties of the clutch, a slight allowance difference of the product, and/or due to long use. As a result, it is unnecessary to mount a torque sensor on driving axles.

Having described the preferred embodiments of the invention referring to the accompanying drawings, it is to be understood that the invention is not limited to those precise embodiments and that various changes and modifications thereof could be effected by one skilled in the art without departing from the spirit or scope of the invention as defined in the appended claims.

What is claimed is:

1. A driving force distribution control system for controlling a transmission of a driving force from a first driving axle to a second driving axle via a clutch, comprising:

basic clutch tightening force calculating means for calculating a basic clutch tightening force to be exerted in tightening the clutch;

basic clutch tightening force correcting means for correcting the basic clutch tightening force by using a correction value;

actual speed difference calculating means for calculating an actual speed difference between an actual revolution speed of said first driving axle and an actual revolution speed of said second driving axle;

reference speed difference calculating means for calculating a reference speed difference in dependency on a kinetic state of a vehicle; and correction value setting means for setting a new correction value to be used by the basic clutch tightening force correcting means according to the actual speed difference and the reference speed difference.

2. The driving force distribution control system according to claim 1, wherein when the actual speed difference is smaller than the reference speed difference, the correction value setting means corrects a previous correction value so that the driving force to be transmitted from said first driving axle to said second driving axle via the clutch decreases.

3. The driving force distribution control system according to claim 1, wherein when the actual speed difference is larger than the reference speed difference, the correction value setting means corrects a previous correction value so that the driving force to be transmitted from said first driving axle to said second driving axle via the clutch increases.

4. The driving force distribution control system according to claim 1, wherein the correction value setting means inhibits the correction of a previous correction value when a road friction coefficient is small.

5. The driving force distribution control system according to claim 1, wherein the correction value setting means inhibits the correction of a previous correction value when power outputted by an engine is large.

6. The driving force distribution control system according to claim 1, wherein the correction value setting means inhibits the correction of a previous correction value when tires of different diameters are attached.

7. A vehicle having a driving force distribution control system according to claim 1, wherein the driving force distribution control system controls transmission of the driving force via the clutch.

8. The driving force distribution control system according to claim 1, wherein the first and second driving axles are a front driving axle and a rear driving axle, respectively.

9. The driving force distribution control system according to claim 1, wherein the first and second driving axles are a left wheel axle and a right wheel axle, respectively.

* * * * *